United States Patent [19]

Poska

[11] 4,341,619

[45] Jul. 27, 1982

[54] SUPERCRITICAL TAR SAND EXTRACTION

[75] Inventor: Forrest L. Poska, Dallas, Tex.

[73] Assignee: Phillips Petroleum Company, Bartlesville, Okla.

[21] Appl. No.: 176,749

[22] Filed: Aug. 11, 1980

[51] Int. Cl.³ .............................................. C10G 1/00
[52] U.S. Cl. ............................................... 208/11 LE
[58] Field of Search .................................... 208/11 LE

[56] References Cited

U.S. PATENT DOCUMENTS

| | | | |
|---|---|---|---|
| 700,489 | 4/1869 | Long et al. ....................... | 208/11 LE |
| 3,208,930 | 9/1965 | Androssy ......................... | 208/11 LE |
| 3,553,099 | 1/1971 | Savage et al. .................... | 208/11 LE |
| 3,558,468 | 1/1971 | Wise ................................. | 208/8 |
| 3,850,738 | 11/1974 | Stewart et al. .................... | 208/8 |
| 3,970,541 | 7/1976 | Williams et al. ................... | 208/8 |
| 4,108,760 | 8/1978 | Williams et al. ................... | 208/11 LE |
| 4,120,775 | 10/1978 | Murray et al. .................... | 208/11 LE |
| 4,189,376 | 2/1980 | Mitchell ............................. | 208/11 LE |
| 4,197,183 | 4/1980 | Audeh ............................... | 208/11 LE |

*Primary Examiner*—Delbert E. Gantz
*Assistant Examiner*—Joseph A. Boska

[57] ABSTRACT

An integrated process for the recovery of carbonaceous material from tar sands by supercritical extraction involving countercurrent flow of the tar sand and the solvent is disclosed.

2 Claims, 1 Drawing Figure

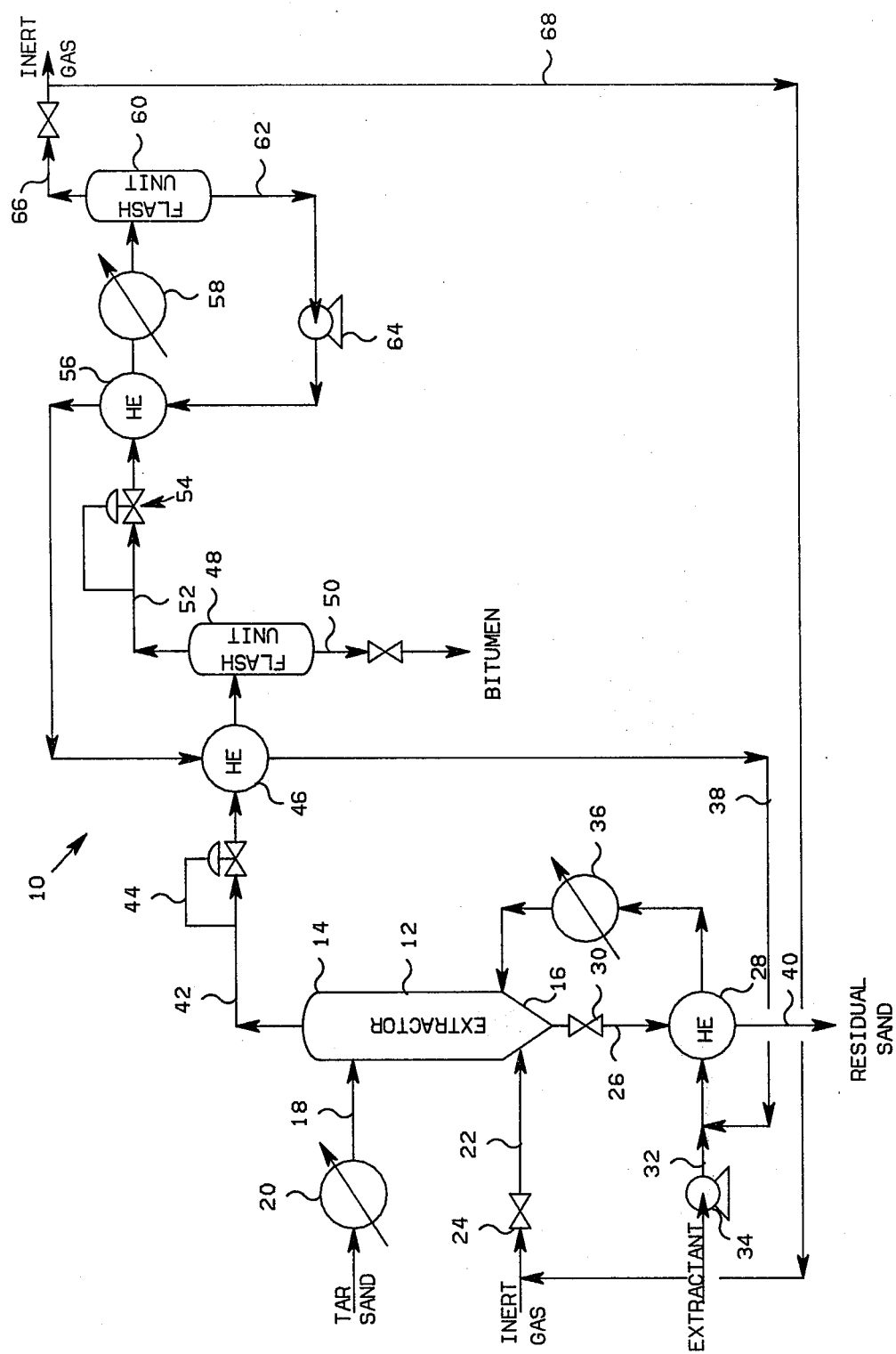

SUPERCRITICAL TAR SAND EXTRACTION

BACKGROUND OF THE INVENTION

Tar sands are a very significant source of carbonaceous material. It is known in the art that carbonaceous materials can be recovered from tar sands in various ways. One process that has been described and is commercially used is a hot water extraction of tar sands. In this process, sodium carbonate and hot water is used for frothing the bitumen. This process involves the use of water and is therefore associated with various problems reaching from the phase separation to environmental concerns.

It also has been proposed to use supercritical extraction of tar sands (see for instance British Pat. No. 1,495,722). A remaining goal in the industry is to provide integrated processes that are energy efficient and yet relatively simple. An additional particular problem encountered in the recovery of carbonaceous materials from tar sands resides in the fact that very fine sand particles are associated with the material and these are normally entrained in the product recovered and have to be removed. This step is both technically difficult and economically demanding.

THE INVENTION

It is one object of this invention to provide an improved process for the recovery of carbonaceous materials from tar sands.

Another object of this invention is to provide a tar sand extraction process wherein the entrainment of fine sands in the product is minimized.

Yet a further object of this invention resides in the provision of a tar sand extraction process that is energy efficient. These and other objects, advantages, details, features and embodiments of this invention will become apparent to those skilled in the art from the following detailed description of the invention, the appended claims and the drawing which shows a schematical flow scheme for the process of this invention.

In accordance with the present invention a process for tar sand extraction is provide which is based on supercritical extraction of the tar sand. Specifically, in accordance with a first embodiment of this invention the process involves the countercurrent contacting of a stream of tar sand and a stream of solvent under supercritical conditions in an extractor. A stream of denuded sand is withdrawn from the extractor and an extract stream which is essentially free of sand is removed from the extractor also. The extract stream is flashed from the supercritical conditions to intermediate conditions below the supercritical conditions such as to generate a gas phase which comprises the solvent and also generate a non-gaseous phase comprising the bitumen. The first gas phase is then used for recovering the solvent which preferably is recycled to the extraction step.

The countercurrent extraction under supercritical conditions is preferably done in an extractor in which the tar sand and the solvent flow essentially in vertical direction. It is convenient to introduce the tar sand into the upper portion of such an extractor and to introduce the solvent into the lower portion thereof. To avoid solvent being carried away with the extracted tar sand the sand that has passed the location of introduction of the solvent is preferably purged with a gas under high pressure. This purge gas is recovered together with the extract stream and is normally also separated and recycled to the extraction step. The purge gas can be any gas which does not create any hazards during the operation. The inert gas is normally free of free oxygen. Examples for the inert gas that can be used are, nitrogen, carbon dioxide, methane, ethane, propane and noble gases. The purge gas is usually separated from the solvent after the flashing step in which the bitumen is separated from the extract. This separation is preferably carried out in a second flashing step wherein the first gas phase from the first flashing zone is cooled and flashed in a second flashing zone to produce a liquid phase consisting essentially of the solvent and a gas phase consisting essentially of the purge gas.

In accordance with the most preferred variation of this embodiment, the denuded sand stream is passed in indirect heat exchange with the stream of solvent prior to the entry of the stream of solvent into the extractor. Usually, the stream of solvent between this indirect heat exchange with the denuded sand and the entry of the solvent into the extractor is further heated to achieve the supercritical conditions. The solvent can also be passed in indirect heat exchange relationship with the extract stream prior to the heat exchange of denuded sand with the solvent.

By the process of this invention the tar sand is contacted with a solvent or an extractant under supercritical conditions of extraction temperature and pressure. This step causes the bitumen to be readily separated from the sand particles and to be incorporated into an extract phase which is withdrawn from the extractor. Essentially no sand particles are entrained with the extract.

It is significant to point out that the countercurrent contacting of the tar sand and the solvent or extractant are achieved in a mobile bed in which the individual sand particles are not turbulently flowing. Rather, the sand particles are in contact with their neighboring particles. This mobile bed condition in the extractor can also be described by the fact that the bed density in the extractor is essentially the same as the density of the sand prior to its extraction, or even slightly higher due to the replacement of the gas between the sand particles by solvent or extractant. Typically, the density of the mobile bed in the extractor will be in the range of 1.0 to 1.9 g/cc on a solvent-free basis.

In accordance with this invention, the process is carried out completely in the absence of any water contacting directly the sand or the hydrocarbon materials. That means that there is no added water. A certain amount of water may of course be present due to the starting material and particularly due to the sand involved. This quantity of water present will, however, be usually very small and needs no further discussion.

The process of the present invention generally involves the introduction of tar sand into an extraction vessel. In the extraction vessel the tar sand is contacted by a preheated extractant under supercritical conditions of extraction temperature pressure, the extractant being capable, under these extraction conditions, of converting substantially all the bitumen in the tar sand to an extract phase. While any suitable solvent can be employed as the extractant in the process, exceptional results have been obtained through the employment of aromatic solvents as the extractant. Suitable solvents for use in the present process possess critical temperatures in the range from about 180° to about 500° C.

Those solvents which may be employed as the extractant in the process of the present invention need not necessarily be completely stable up to a temperature of 550° C. or have critical temperatures within the ranges stated, but it has been found that solvents which fulfill these criteria tend to be more effective.

Typical solvents suitable for use as the extractant include aromatic hydrocarbons having a single benzene ring and preferably not more than 4 carbon atoms in substituent groups. For example, benzene, toluene, xylene, ethylbenzene, isopropylbenzene and tri- and tetra-methylbenzenes. Alicyclic hydrocarbons can also be employed, preferably those having at least 5 carbon atoms and less than 12 carbon atoms per molecule. Typical cycloaliphatic compounds which can be employed as extractant are cyclopentane, cyclohexane, and cis- and trans-decalin and alkylated derivatives thereof. Aromatic hydrocarbons having two aromatic rings can also be employed although it should be noted that their critical temperatures are relatively high. These last-mentioned compounds include, for example, naphthalene, methylnaphthalene, biphenyl and biphenyl methane.

Acyclic hydrocarbons having at least 5 carbon atoms but not more than 16 carbon atoms can also be employed as extractant, for example, hexanes, octanes, dodecanes, and hexadecanes. Such aliphatic hydrocarbons are preferably saturated, as the corresponding alkenes will be at least partially hydrogenated or alkylated or otherwise subjected to polymerization under the conditions of extraction.

Where acyclic hydrocarbons are being employed, it is preferred to use relatively straight chain hydrocarbons since hydrocarbons having long branch chains are more likely to be subjected to molecular rearrangement and cross-alkylation reactions under the conditions of extraction. Such molecular rearrangements and cross-alkylation reactions can also occur in the case of alkyl substituted aromatic hydrocarbons.

Phenols, preferably those derived from aromatic hydrocarbons having up to 8 carbon atoms, for example, phenol and xylenol, can be employed. However, if hydrogen is present, the phenol, i.e. hydroxyl group may be liable to be reduced under the extraction conditions. Many other oxygen-containing compounds can be employed in the extractant including alcohols, aldehydes, ketones, ethers and esters. If hydrogen is present, many of these compounds are liable to be reduced under the extraction conditions and their use in large quantities as solvent components of the extractant is not, therefore, desirable. Furthermore, such oxygen-containing compounds are liable, in the presence of catalyzing impurities in the tar sand, to react with tar sand or other compounds (producing gases) or to be subjected to molecular rearrangement, and, in such circumstances, this may affect the amount of solvent available for recycling in the process. Nitrogen-containing organic compounds can also be employed in the solvent, such as amines including aliphatic mono- di- and tri-amines which have at least 4, and preferably at least 6 carbon atoms. It is preferred, however, not to employ aliphatic amines having more than 10 carbon atoms. The amines may be acyclic aliphatic amines, for example tri-ethylamine and di-propylamine, while aromatic amines having a benzene ring may also be employed, for example aniline, n-methylaniline, n,n-dimethylaniline, toluidine, and n-methyltoluidine. Hetrocyclic amines can also be employed, for example pyridine, methylpyridines, and dimethylpyridines, and alkyl derivatives of piperydine and also halogen-containing organic compounds such as chlorobenzene and sulfur compounds such as alkylthiophenes.

While any suitable supercritical extraction temperature can be employed which will provide the desired extraction of bitumen from tar sand in the extraction vessel, the extraction temperature will generally be in the range from about the critical temperature of the extractant to about 100° C. in excess of the critical temperature of the extractant, and preferably in the range from about the critical temperature of the solvent to about 50° C. in excess of the critical temperature of the solvent.

Again, while any suitable extraction temperature can be employed, generally the extraction temperature will be in the range from about 180° to about 600° C. and preferably in the range from about 180° to about 500° C. The extraction operation can be performed at any suitable supercritical extraction pressure, but generally the extraction temperature will be in the range from about the critical pressure of the extractant to about 1000 atmospheres or higher, depending on system physical limitations, and preferably in the range from about the critical pressure of the extractant to about 5000 psi (34.47 MPa).

The extract phase is withdrawn from the upper portion of the extraction vessel in the gaseous phase and is passed to a suitable separation vessel where the pressure is reduced to effect the precipitation of the bitumen from the extract phase. Extractant vapors from the separation vessel, still containing a portion of the bitumen from the tar sand, are subsequently condensed to a liquid. The condensed extractant is then recycled for reuse in the extraction process along with the required amount of makeup extractant, while any uncondensed gases are recycled, vented or otherwise disposed of as desired.

It is presently preferred that the separation of the extract stream into a gaseous phase comprising the solvent and a nongaseous phase comprising bitumen is done in a first flash chamber. The conditions of operation in this flash chamber are best described by the pressure drop that the extract is subjected to and the temperature. The pressure will usually be in the range of 50 to 500 psi (0.35–3.5 MPa) and the temperature drop will be in the range of 40° to 400° F. (22°–200° C.).

Preferably after a further cooling step, the gas phase of this first flash step is subjected to a second flashing operation in which a gas phase is recovered which may contain the purge gas mentioned earlier and a liquid phase is recovered which consists essentially of the solvent having possibly some bitumen dissolved therein. This liquid phase preferably is recycled into the extraction step and the gas phase also preferably is recycled for the purge operation described above.

Referring now to the drawing, there is illustrated therein a supercritical extraction system generally designated by the reference character 10.

The extraction system includes an extractor in the form of a closed extraction vessel 12, having upper and lower portions 14 and 16. The conduit 18 provides means for conducting tar sand from a suitable source to the interior of the upper portion 14 of the extraction vessel 12. A suitable heater 20 is interposed in the conduit 18 to elevate the temperature of the tar sand to a temperature near the extraction temperature within the extraction vessel 12. A conduit 22 provides means for conducting an inert gas, such as nitrogen, into the interior of the lower portion 16 of the extraction vessel 12. A suitable valve 24 is interposed in the conduit 22 to provide desired control of gas flow through the conduit 22 into the extraction vessel 12. A conduit 26 extends downwardly from the extraction vessel 12 and provides communication between the interior of the lower portion 16 of the extraction vessel 12 and a suitable depository for residual sand withdrawn from the extraction vessel 12. A heat exchanger 28 is interposed in conduit 26. A suitable control valve 30 is also interposed in conduit 26.

Fresh extractant is introduced into the system by means of a pump 34 and conduit 32. Both the fresh extractant and the recycled extractant from line 38 are passed through indirect heat exchange relationship with the diluted tar sand in the heat exchanger 28 and are further heated in heater 36 and introduced into the lower portion of extractor 12 at a point above the point of introduction of purge gas. Denuded sand is removed from heat exchanger 28 via line 40.

The extract stream consisting essentially of the extractant or solvent, the extracted carbonaceous material (bitumen) and the purge gas is withdrawn from the upper portion of the extractor via conduit 42. The flow in this conduit may be controlled by a flow controller 44. The extract stream is passed through indirect heat exchange in the heat exchanger 46 in contact with the solvent recycle stream in conduit 38 and introduced into a first flash chamber 48.

From the first flash chamber 48 a fluid stream comprising the bituminous product is withdrawn via conduit 50. A gaseous overhead stream comprising the extractant or solvent, the purge gas when used and some bitumen is withdrawn via conduit 52. The flow in conduit 52 may be controlled by a flow controller 54. The overhead stream in conduit 52 is passed through indirect heat exchanger 56 and an optional cooler 58 to a second flash chamber 60. A liquid bottom stream comprising the solvent and possibly some bitumen is withdrawn from the second flash chamber 60 via conduit 62. This fluid is recycled via pump 64 through the heat exchangers 56, 46, 28 and the heating station 36 for reintroduction into the extractor.

As an overhead stream a stream of purge gas is withdrawn via conduit 66. This purge gas preferably is recycled to the extractor via conduit 68.

Instead of introducing the purge gas by means of conduit 22 into the bottom section of the extractor, it is also within the invention to introduce this purge gas into the unit by which the sand is actually removed from the extractor which may be a screw conveyor or a star valve or a pressure drop channel.

Reasonable variations and modifications which will become apparent to those skilled in the art can be made in this invention without departing from the spirit and scope thereof.

I claim:
1. A process for the recovery for the recovery of carbonaceous materials from tar sand comprising
   (a) heating said tar sands to a temperature near the extraction temperature,
   (b) countercurrently in an extractor free of added water contacting a stream of tar sands and a stream of solvent under supercritical conditions with respect to the solvent, where the stream of tar sand is introduced into the upper portion of said extractor flowing essentially vertically downward, and where said solvent is introduced into the lower portion of said extractor flowing essentially vertically upward, such as to produce a stream of denuded sand and an extract stream essentially free of sand;
   (c) introducing a stream of inert gas into the lower portion of said extractor to purge said solvent from said denuded sand,
   (d) passing said stream of solvent prior to its contact with the tar sand in indirect heat exchange contact with said denuded sand and via additional heating means into said lower part of said extractor,
   (e) passing said extract stream through indirect heat exchange with a stream of recycled solvent,
   (f) flashing said extract stream from step (e) to recover a gas phase comprising said solvent and said inert gas, and a non-gaseous phase comprising bitumen,
   (g) cooling said gas phase by passing it in indirect heat exchange with said stream of recycled solvent,
   (h) separating the so-cooled gas phase into a stream of said inert gas and said stream of recycled solvent;
   (i) recycling said stream of recycled solvent to the extraction step;
   (j) recycling said stream of said inert gas into step (c), with the proviso that the entire process is carried out in the absence of added water.

2. A process in accordance with claim 1 in which said countercurrent contacting of said tar sands and said solvent stream is achieved in a mobile bed in which said individual sand particles are not turbulently flowing, but are in contact with neighboring particles, such that the bed density within said extractor is essentially the same as the density of the sand prior to its extraction, said density ranging from 1.0 to 1.9 grams/cc on a solvent-free basis.

* * * * *